United States Patent
Smith

(10) Patent No.: US 11,340,826 B2
(45) Date of Patent: May 24, 2022

(54) SYSTEMS AND METHODS FOR STRONG WRITE CONSISTENCY WHEN REPLICATING DATA

(71) Applicant: Kioxia Corporation, Tokyo (JP)

(72) Inventor: Hubbert Smith, Sandy, UT (US)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 16/570,761

(22) Filed: Sep. 13, 2019

(65) Prior Publication Data
US 2021/0081132 A1   Mar. 18, 2021

(51) Int. Cl.
*G06F 3/06* (2006.01)

(52) U.S. Cl.
CPC .......... *G06F 3/0653* (2013.01); *G06F 3/0619* (2013.01); *G06F 3/0659* (2013.01); *G06F 3/0679* (2013.01)

(58) Field of Classification Search
CPC .... G06F 3/0653; G06F 3/0619; G06F 3/0659; G06F 3/0679; G06F 12/0246
See application file for complete search history.

(56) References Cited

U.S. PATENT DOCUMENTS

| | | | | |
|---|---|---|---|---|
| 8,301,832 | B1 * | 10/2012 | Moore | G06F 3/0659 711/103 |
| 9,081,665 | B2 | 7/2015 | Shuette et al. | |
| 10,565,062 | B1 * | 2/2020 | Rajaa | G06F 11/1451 |
| 2002/0016827 | A1 * | 2/2002 | McCabe | F06D 11/2069 709/213 |
| 2004/0073831 | A1 * | 4/2004 | Yanai | G06F 3/0689 714/6.32 |
| 2009/0307286 | A1 * | 12/2009 | Laffin | G06F 11/1456 |
| 2014/0215122 | A1 * | 7/2014 | Li | G06F 11/1666 711/103 |
| 2015/0242151 | A1 * | 8/2015 | Makuni | G06F 3/0679 711/103 |
| 2019/0065382 | A1 * | 2/2019 | Velayuthaperumal | G06F 3/065 |
| 2020/0194065 | A1 * | 6/2020 | Schmier | G11C 11/5642 |

FOREIGN PATENT DOCUMENTS

WO    WO-2017007487 A1 *  1/2017   ............. G06F 11/14

* cited by examiner

*Primary Examiner* — Michael Krofcheck
(74) *Attorney, Agent, or Firm* — Allen & Overy LLP

(57) ABSTRACT

A solid state drive is provided for improving write consistency when replicating data. The solid state drive includes a plurality of memory die, a host interface, and a memory controller. The memory controller is configured to receive write commands from a host server, update a list of write commands and a status of execution of the write commands to include the write commands from the host server, and write data payloads associated with the write commands to at least a first memory die and a second memory die of the plurality of memory die. In response to the data payloads being written, the memory controller is configured to update the status of execution for the data payloads in the list of write commands and receive an indication that the data payloads have been written to an external device.

16 Claims, 3 Drawing Sheets

SYSTEMS AND METHODS FOR STRONG WRITE CONSISTENCY WHEN REPLICATING DATA

FIELD OF THE INVENTION

This invention generally relates to solid state drive (SSD) architectures, and more particularly, to SSD architectures for improving write consistency when replicating data stored in the cloud.

BACKGROUND OF THE INVENTION

Conventionally, data stored on a server in the cloud may be replicated by a first server transmitting data to a second server over a network connection (e.g., Ethernet). However, this server-to-server method, due to the finite time taken to transfer the data, there is a high risk of data loss due to multiple possible single points of failure of the first server, or failure of the second server, and/or a failure of the network connection.

Another conventional data storage replication technique used replicates data onto a solid state drive (SSD) device on a server over a network connection (e.g., Ethernet). When replicating data stored on a server in the cloud, a host interface coupled to the server instructs an SSD controller to write the data to an SSD device. Again, there is potential for data loss if the replication does not proceed to completion.

Enterprises attempting to adopt cloud storage have not accepted the risks of data loss associated with the server-to-server and server-to-SSD methods and have relied on server-to-Redundant Array of Inexpensive Drives (RAID) methods to replicate the data to other devices, servers, or datacenters. The server-to-RAID method writes the data to a secondary storage that is RAID protected before writing to a second server. However, RAID replication is expensive, time consuming, and hardware intensive. For example, RAID replication requires significant processing cycles and requires permanent memory capacity. RAID replication also contains failure points; RAID fails to protect against device failure, node failure, a data center disaster (e.g., power failure, flood, natural disaster, etc.) and has a large window of time for a single point of failure (around 1-2 seconds) where there is only one copy of data available.

Accordingly, there is a need for an improved SSD architecture for improving the write consistency when replicating data stored on a cloud server.

BRIEF DESCRIPTION OF THE INVENTION

In an aspect, a method for improving write consistency when replicating data is presented. The method includes receiving one or more write commands from a host server, updating a list of write commands and a status of execution of the write commands to include the one or more write commands from the host server, and writing one or more data payloads associated with the one or more write commands, respectively, to at least a first memory die of the plurality of memory die and to a second memory die of the plurality of memory die. In response to the one or more data payloads being written, the method further includes updating the status of execution for the one or more data payloads in the list of write commands and receiving an indication that the one or more data payloads have been written to an external device.

In another aspect, a solid state drive for improving write consistency when replicating data is presented. The solid state drive includes a plurality of memory die, a host interface, and a memory controller. The memory controller is configured to receive one or more write commands from a host server, update a list of write commands and a status of execution of the write commands to include the one or more write commands from the host server, and write one or more data payloads associated with the one or more write commands, respectively, to at least a first memory die of the plurality of memory die and to a second memory die of the plurality of memory die. In response to the one or more data payloads being written, the memory controller is configured to update the status of execution for the one or more data payloads in the list of write commands and receive an indication that the one or more data payloads have been written to an external device.

DETAILED DESCRIPTION OF THE INVENTION

Figure 1:
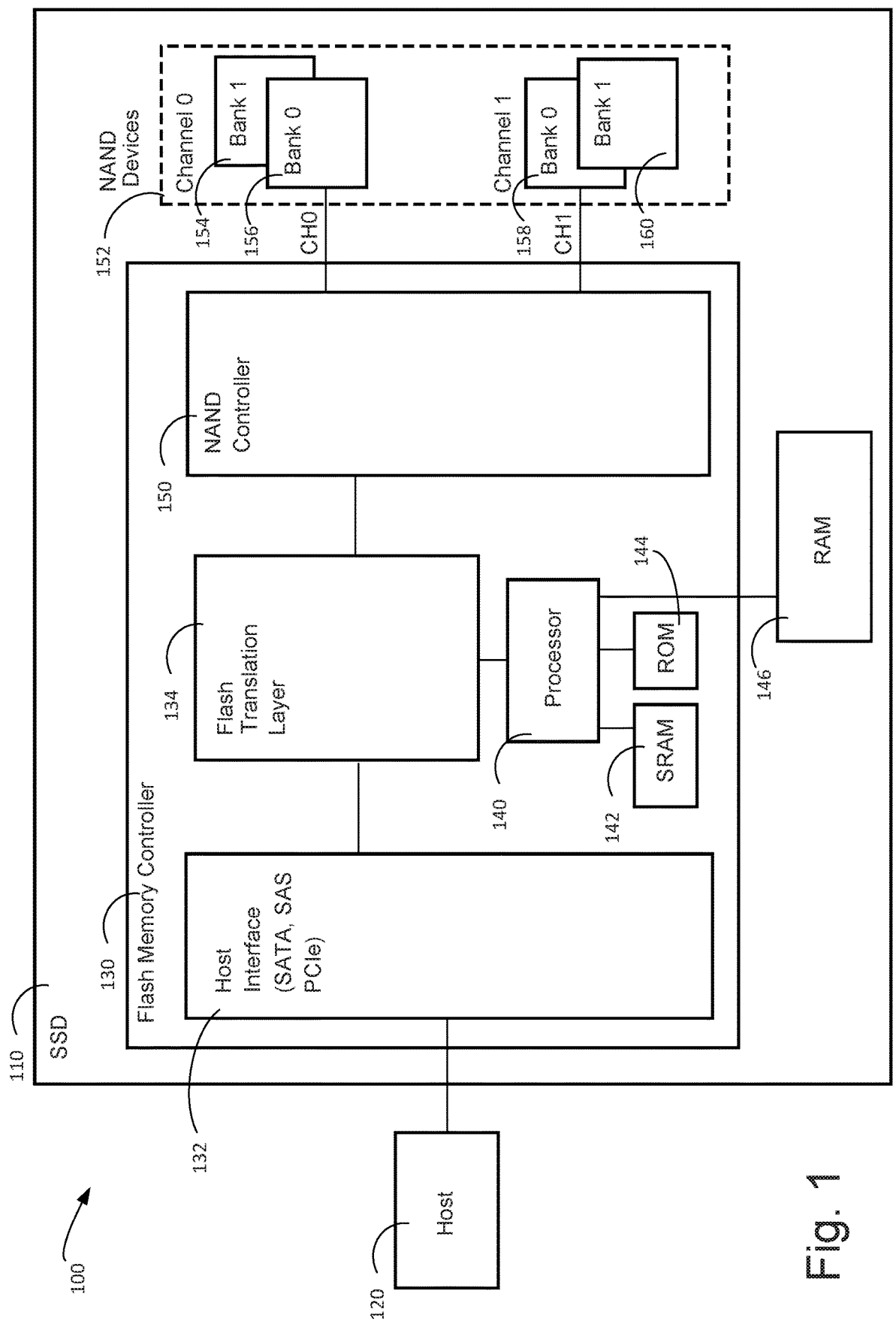
FIG. 1 is a block diagram of the structure of an SSD, according to one embodiment of the invention, according to some embodiments.

FIG. 1 is a block diagram of the structure of an SSD, according to one embodiment of the invention. As shown in FIG. 1, system 100 includes, but is not limited to, a solid state drive 110 with a memory controller 130. In one embodiment, the memory controller 130 supports flash memory. The memory controller 130 includes host interface 132, which is communicatively coupled to host 120 and enables SSD 110 to communicate with host 120. Host 120 may comprise any suitable device, such as a computer, a storage appliance, a server (remote or local), a mobile device, or any other comparable device. In one embodiment, host interface 132 is a PCIe connector that can be coupled to a PCIe bus (not shown) or an enterprise server or other computing system host using, for example, an NVMe protocol. Other hardware connection types, for example SATA, and SCSI, are within the scope of the invention.

In an embodiment employing flash memory in the SSD, flash translation layer 134 manages data written to or read from NAND devices 152. For example, data to be written to NAND devices 152 is routed by flash translation layer 134 to NAND controller 150. Similarly, data read from NAND devices 152 is routed through NAND controller 150 to flash translation layer 134. Flash translation layer 134 buffers the data in an appropriate area of a data cache in volatile memory, e.g., random-access memory, which may be located within the NAND controller 150 (SRAM 142) or external to the controller (RAM 146). The SRAM 142 functions as a fast data cache memory and may employ static random access memory (SRAM). The RAM 146 functions as a data cache memory and may employ dynamic random access memory (DRAM), ferroelectric random access memory (FeRAM), magnetoresistive random access memory (MRAM), and the like. Flash translation layer 134 is communicatively coupled to processor 140. Processor 140 is communicatively coupled to SRAM 142, ROM 144, and RAM 146.

NAND controller 150 is communicatively coupled to NAND devices 152. The NAND controller 150 interfaces to the NAND devices 152 by one or more flash memory buses, called channels. For simplicity, FIG. 1 shows only two channels, although there may be 4, 8, 16, or more channels. Each channel is connected to multiple NAND memory devices, which in one embodiment are arranged in a row with one or more memory dies within each device. Other embodiments of arrangements of NAND devices may be possible and within the scope of this disclosure.

FIG. 1 shows one example arrangement, where NAND devices 152 comprises NAND devices arranged in rows, with each row comprising one or more memory dies coupled to the NAND controller 150 by a channel, respectively. In one embodiment, the dies or devices may be grouped together into units (e.g., banks) which are independently selectable using chip enable signals. FIG. 1 shows 2 banks per channel (for example, Bank 0 and Bank 1), although there may be 4, 8, 16, or more banks per channel. The first NAND device row includes a first bank (Bank 0) 156 and a second bank (Bank 1) 154 coupled to the NAND controller 150 by channel 0. The second NAND device row includes first bank (Bank 0) 158 and second bank (Bank 1) 160 coupled to the NAND controller 150 by channel 1.

The NAND devices 152 are configured to store data read and written from and into host 120 via host interface 132. For example, in the embodiment shown in FIG. 1, NAND devices 152 are organized into two sets of banks—bank 154 and bank 156 communicatively coupled to the NAND controller 150 via channel 0, and bank 158 and bank 160 communicatively coupled to the NAND controller 150 via channel 1.

Figure 2:
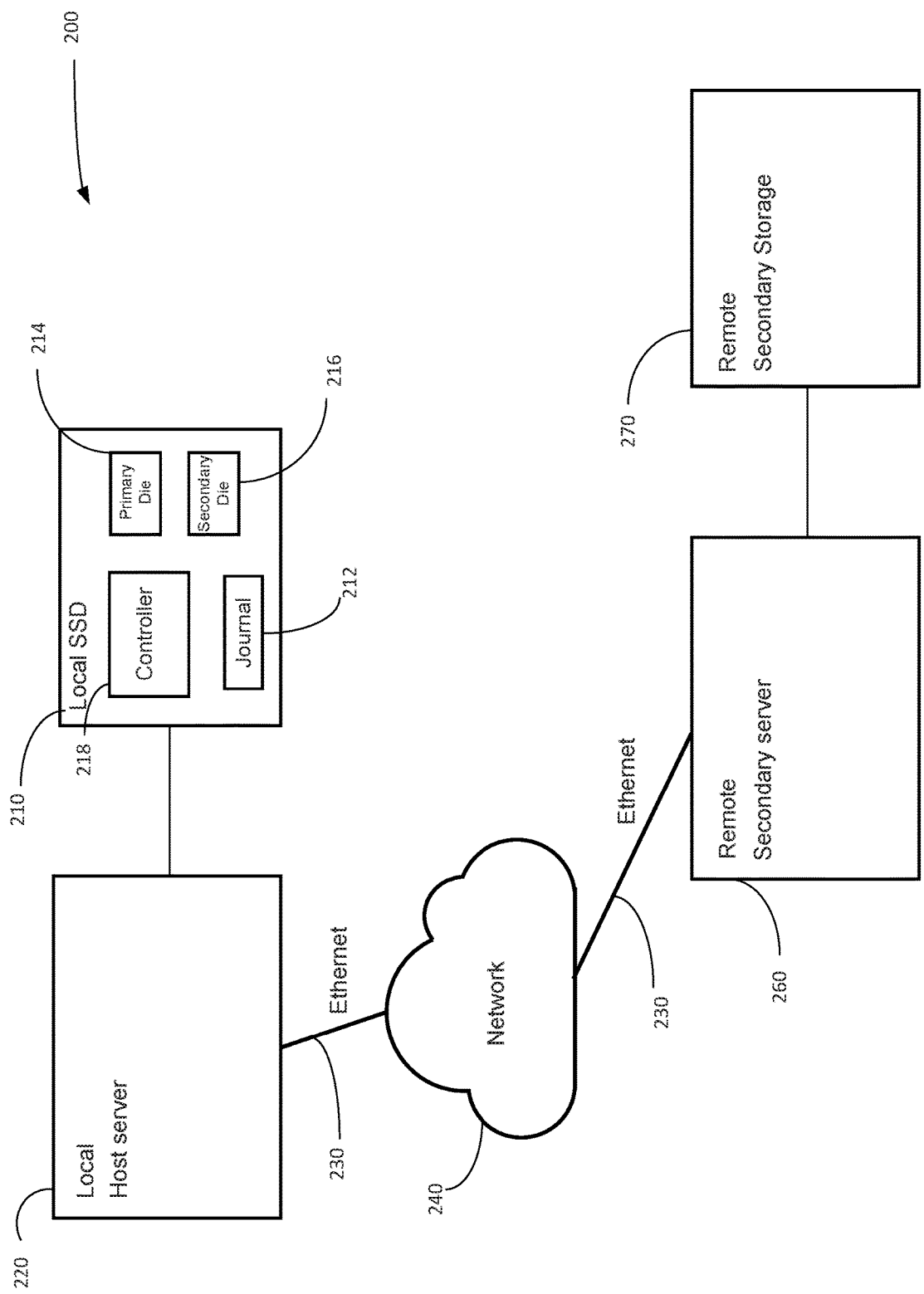
FIG. 2 is a block diagram of an SSD architecture for improving write consistency when replicating data stored in the cloud, according to some embodiments.

FIG. 2 is a block diagram of an SSD architecture for improving write consistency when replicating data stored in the cloud. FIG. 2 includes system 200 with SSD 210 that includes, but is not limited to, controller 218, journal 212, primary die 214, and secondary die 216. Primary die 214 and secondary die 216 are non-volatile memory devices. SSD 210 is communicatively coupled to local host server 220. The local host server 220 is also communicatively coupled to network 240 via Ethernet 230. The network 240 is communicatively coupled to remote secondary server 260, which includes or is communicatively coupled to remote secondary storage 270.

In some embodiments, SSD 210 is the SSD 110 from FIG. 1, and has the same functionalities and characteristics as described above with reference to FIG. 1. Accordingly, memory controller 218 corresponds to NAND controller 150, and primary die 214 and secondary die 216 are included in NAND devices 152. Furthermore, SSD 210 can communicate with local host server 220 (corresponding to host 120) via host interface 132.

In some embodiments, local host server 220 transmits one or more write commands to SSD 210 to write data to primary die 214. The one or more write commands may correspond to a request from local host server 220 to replicate and provide redundant copies of the data corresponding to the write commands on both a local SSD (e.g., local SSD 210) and/or remote secondary server 260. In response to receiving the one or more write commands, flash translation layer 134 manages the data written to primary die 214 and secondary die 216 (e.g., in NAND devices 152). The data to be written to NAND devices 152 is routed by flash translation layer 134 to NAND controller 150 (e.g., controller 218). Flash translation layer 134 stores the data in an appropriate area of a data cache in volatile memory (e.g., SRAM 142 or RAM 146). Upon receipt of the write command, memory controller 218 may add the unexecuted write command to journal 212, where journal 212 comprises a list (e.g., journal entries) of one or more unexecuted write commands in the data cache in volatile memory (e.g., RAM 146). Journal 212 may be stored in either volatile or non-volatile memory on SSD 210. For example, journal 212 may be stored in NAND devices 152. As another example, journal 212 may be stored on secondary die 216. As another example, journal 212 may be stored on primary die 214. And as yet another example, journal 212 may be stored in an area of the data cache in volatile memory (e.g., SRAM 142 or RAM 146).

As such, memory controller 218 may compile a list in journal 212 of the one or more unexecuted write commands in cache that includes parameters about each unexecuted write command, but does not include the data payloads corresponding to each unexecuted write command. For example, the parameters may include, but are not limited to, a destination logical block address, the number of logical blocks of data to be written, a list of destination logical block addresses and numbers of logical blocks of data to be written, a position in the submission queue in the cache, and a status about each write command, as described in detail below. For example, the parameter data associated with each unexecuted write command may be less than one hundred bytes of data, while the data payloads corresponding to each write command may be ten to a few hundred MBs of data. Therefore, the write time of parameters to journal 212 is much faster.

After the parameters of the one or more unexecuted write commands have been written into journal 212, memory controller 218 may write the data payloads corresponding to the unexecuted write commands to both primary die 214 and secondary die 216 such that the secondary die 216 has a redundant copy of the data payloads corresponding to the write commands.

In some embodiments, memory controller 218 is configured to write the data payloads corresponding to the unexecuted write commands to both the primary die 214 and the secondary die 216 in parallel. For example, primary die 214 may correspond to a memory die in bank 152 or bank 154 (e.g., communicatively coupled to the NAND controller 150/controller 218 via channel 0), and secondary die 216 may correspond to a memory die in bank 158 or bank 160 (e.g., communicatively coupled to the NAND controller 150/controller 218 via channel 0). Controller 218 may write the data payloads corresponding to the unexecuted write command concurrently (e.g., in parallel) across each channel (e.g., channel 0 and channel 1) to both the primary die 214 and the secondary die 216. After the write has been completed, both the primary die 214 and the secondary die 216 have a copy of the data payloads corresponding to the write commands stored in their respective non-volatile memory dies. Therefore, the data payloads written to the secondary memory die 216 is a redundant copy of the data.

In some embodiments, primary die 214 and secondary die 216 may be comprised in the same bank (e.g., bank 152, or bank 154, or bank 158, or bank 160, etc.). In some embodiments, primary die 214 and secondary die 216 may be comprised in different banks (e.g., bank 152 and bank 156 or bank 158 and bank 160) associated with different channels (e.g., channel 0 and channel 1). Controller 218 may write the data payloads corresponding to the unexecuted write commands in parallel across the channels associated with said different banks.

In some embodiments, controller 218 may write the data payloads corresponding to the unexecuted write commands sequentially. First to primary die 214 and second to secondary die 216. Therefore, a copy of the data payloads may be written on primary die 214 before a second copy of the data payloads has been written on secondary die 216.

In some embodiments, the redundant copy of the data payloads on the secondary die 216 is only stored temporarily on secondary die 216. The redundant copy of the data payload is stored until the data payloads corresponding to the one or more write commands have been successfully written on local SSD 210 and written over network 240 via Ethernet 230 to the remote secondary storage 270 included in remote secondary server 260.

After completing the writes to both the primary die 214 and the secondary die 216, controller 218 may update the status of the one or more journal entries in journal 212 corresponding to the one or more completed write commands. The journal entries may comprise a status parameter that reflects the status of each write command. In some embodiments, the status may correspond to "uncompleted," "dirty local write," "clean local write," or "clean remote write." Each status may be represented by a corresponding series of one or more bits. The "uncompleted" status corresponds to an unexecuted write command that has not been successfully written to either the local SSD 210 or the remote secondary server 260 (e.g., the data corresponding to the unexecuted write command only resides on the local host server 220). The "dirty local write" status corresponds to a write command that has been successfully written to the primary die 214 but not the secondary die 216 in local SSD 210. The "clean local write" status corresponds to a write command that has been successfully written to both the primary die 214 and the secondary die 216 in local SSD. Accordingly, the "clean remote write" status corresponds to a write command that has been successfully written to remote secondary server 260.

In some embodiments, when the data payloads are written to both the primary die 214 and the secondary die 216 in parallel, the status of the write commands in journal 212 may be updated from "uncompleted" to "clean local write" as the writes are completed on both the primary die 214 and the secondary die 216 simultaneously. In some embodiments, after completing the write to the primary die 214 but not secondary die 216, controller 218 may update the status of the one or more write commands corresponding to the completed write commands on the primary die 214 from "uncompleted" to "dirty local write." Further, after the write to the secondary die 216 is completed, controller 218 may update the status of the one or more write commands corresponding to the completed write commands on the secondary die 216 from "dirty local write," to "clean local write."

In some embodiments, after the data payloads corresponding to the one or more write commands have been written to local SSD 210 (e.g., on both the primary die 214 and the secondary die 216), local host server 220 transmits the one or more write commands to the remote secondary server 260. The one or more write commands are transmitted via network 240 over Ethernet 230 to remote secondary server 260.

A controller (not shown in FIG. 2) associated with remote server 260 may manage the write commands received from the local host server 220. For example, the controller associated with the remote server may transmit the write commands to remote secondary storage 270, which may be included in remote secondary storage 260, or may be communicatively coupled to remote secondary storage 270. In some embodiments, remote secondary storage 270 is an SSD, such as SSD 110.

In response to receiving the one or more write commands at remote secondary storage 270, flash translation layer 134 manages the data payloads written to NAND devices 152. The data to be written to NAND devices 152 is routed by flash translation layer 134 to NAND controller 150. NAND controller 150 then write the data payloads corresponding to the write commands into one or more memory die of NAND devices 152. In response to successfully writing the data payloads into remote secondary storage 270, the controller associated with remote secondary server 260 acknowledges the successful write to local SSD 210 and/or local host server 220 (e.g., by transmitting an acknowledgement bit/command). Local host server 220 informs the local host SSD 210 of the acknowledgement which then updates the status of the one or more successfully executed write commands in journal 212 from "clean local write" to "clean remote write."

In some embodiments, in response to the status of the write commands in journal 212 updating to "clean remote write," controller 218 in local SSD 210 reallocates the memory corresponding to the copy of the data on secondary die 216 to be "free memory" (e.g., deletes the redundant copy of the data). The memory corresponding to the data can be reallocated as there are now two copies of the data stored in system 200—on primary die 214 and on remote secondary server 260. Thus, the memory allocated for the redundant copy of the data is a temporary allocation of space, and does not require excess storage space or devices to be integrated into the system.

In some embodiments, memory controller 130 may remove a write command from the journal 212 once the command has been fully executed (e.g., a copy of the data exists on the local SSD 210, a copy of the data exists on the remote secondary server 270, and the memory corresponding to the data on the secondary die 216 has been reallocated).

The above described systems and methods of replicating cloud server data is a robust and efficient system and method that protects the data being replicated against a plethora of different failure events, as described in detail below.

Figure 3:
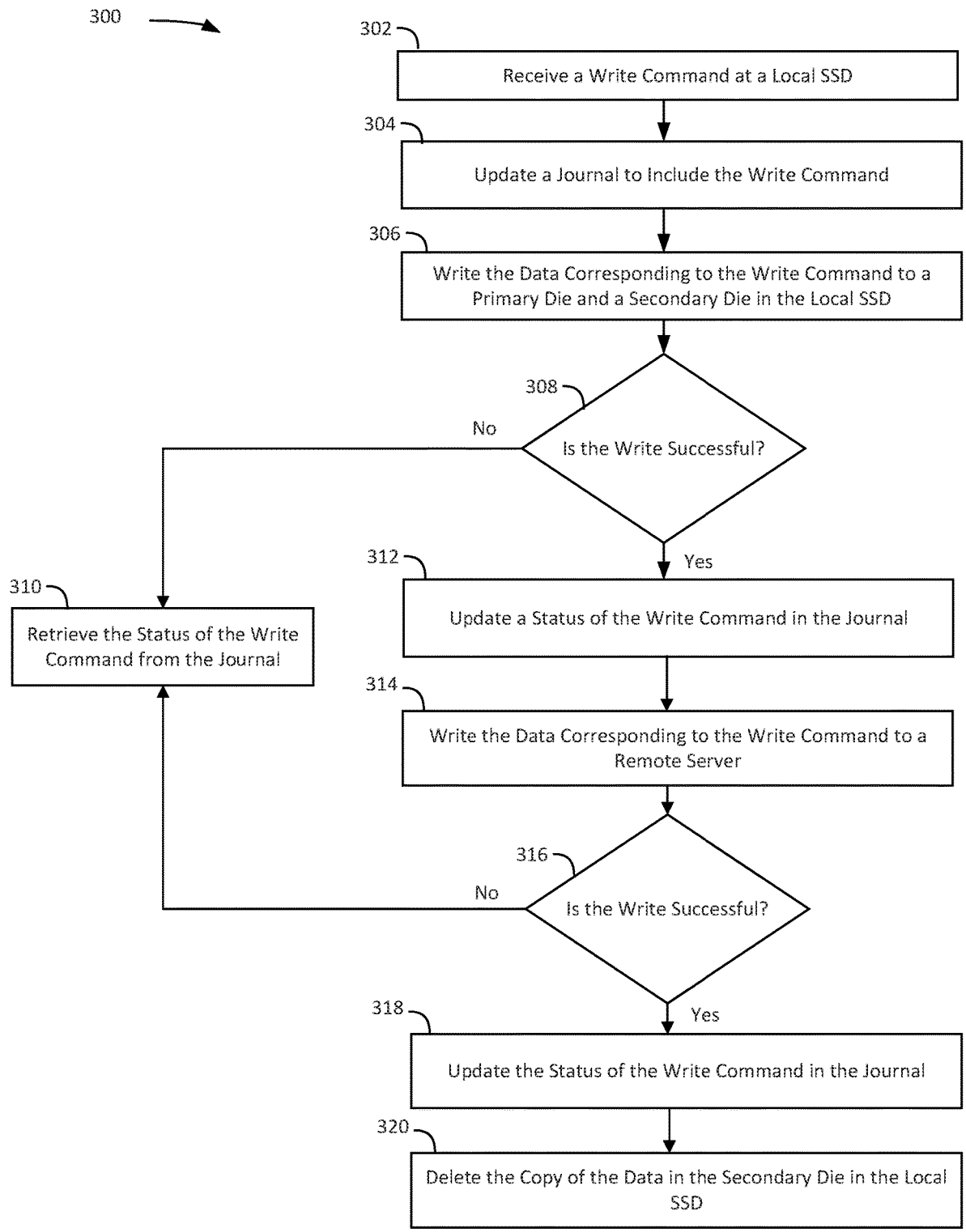
FIG. 3 is flow chart of a method for improving write consistency when replicating data stored in the cloud, according to some embodiments.

FIG. 3 shows a process for improving write consistency when replicating data stored in the cloud, according to some embodiments. Process 300 begins at 302, where local SSD 210 receives a write command from local host server 220. At 304, in response to receiving the write command, controller 218 updates journal 212 in local SSD 210 to include the unexecuted write command from local host server 220. At 306, controller 218 writes the data payloads corresponding to the write command to primary die 214 and secondary die 216 in local SSD 210, as described above. At 308, controller 218 determines whether the write was successful. If, at 308, controller 218 determines that the "No," the write was not successful, then process 308 continues to 310.

At 310, controller 218 retrieves the statuses of the write commands from journal 212. In some instances, an unsuccessful write at 308 is indicative of the primary die 214 on the SSD 210 failing. When the primary die 214 on the SSD 210 fails, controller 218 logs the failure in the journal 212 and retrieves the status of the write commands from journal 212. The controller 218 determines from the retrieved statuses what data was lost in the primary die 214 failure, and where it can retrieve said lost data. For example, if the status corresponds to a "dirty local write" or "uncompleted," controller 218 may request that the local host server 220 retransmit the data payloads corresponding to a "dirty local write" or "uncompleted" write. If the status corresponds to a "clean local write," controller 218 may retrieve the data payloads from the secondary die 216 and write the data payloads to a third die on local SSD 210. The recovery performance is enhanced because the process of retrieving and writing the data payloads to a third die only takes a few processing cycles. Then, journal 212 may update the journal entry corresponding to the "clean local write" write commands indicating that the data is stored on the third die.

If, at 308, controller 218 determines that "Yes," the write was successful, process 308 continues to 312. At 312, controller 218 updates the status of the write command in journal 212. For example, controller 212 updates the status of the write command to "clean local write" in journal 212 to indicate that the data was successfully written to both primary die 214 and secondary die 216. At 314, local host server 220 transmits the write command to a remote secondary server 260 and a controller associated with secondary remote server 260 writes the corresponding data onto storage (e.g., remote secondary storage 270) within or coupled to the remote secondary server 260. For example, the controller associated with secondary remote server 260 writes the data payloads corresponding to the write command into NAND devices 152 of remote secondary storage 270 (when remote secondary storage 270 is the SSD 110 of FIG. 1).

At 316, the local host server 220 determines whether the write to the remote secondary server 260 was successful. If, at 316, the local host server 220 determines that "No," the write was not successful, then process 316 reverts to process 310.

In some instances, the write to the remote secondary server 260 may be unsuccessful because of a slowdown or failure of Ethernet 230. For example, there may be insufficient bandwidth, wireless interference, excessive signal attenuation, a power outage, network 240 failure, or any other issue that may cause a slowdown or overall failure of the Ethernet 230. In response to a slowdown or failure of Ethernet 230, local host server 220 may instruct controller 218 to log the Ethernet failure into journal 212. Upon restoration of Ethernet 230, the local host server 220 may transmit the write command to remote secondary server 260. After a controller associated with remote secondary server 260 successfully writes the data payloads associated with the write commands into remote secondary storage 270 included in or coupled to the remote secondary server 260, local host server 220 may instruct controller 218 to update the status of the successfully written write commands in journal 218 to "clean remote write."

In some instances, the write to the remote secondary server 260 may be unsuccessful because the remote secondary server 260 fails. For example, there may be a power outage, network 240 failure, firmware malfunction, or other issue that causes the failure of remote secondary server 260. In response to the failure of remote secondary server 260, local host server 220 may instruct controller 218 to log the remote secondary server failure into journal 212. Upon restoration of remote secondary server 260, the local host server 220 may transmit the write command to remote secondary server 260. After a controller associated with remote secondary server 260 successfully writes the data payloads associated with the write commands into remote secondary storage 270 included in or coupled to remote secondary server 260, local host server 220 may instruct controller 218 to update the status of the successfully written write commands in journal 218 to "clean remote write."

In some instances, local host server 220 may be fail. For example, there may be a power outage, firmware malfunction, or other issue that causes the failure of local host server 220. In response to detecting the failure of local host server 220, controller 218 may log the remote secondary server failure into journal 212. Upon restoration of local host server 220, the local host server 220 may transmit the write command to remote secondary server 260. After a controller associated with remote secondary server 260 successfully writes the data payloads associated with the write commands into remote secondary storage 260 included in or coupled to remote secondary server 260, local host server 220 may instruct controller 218 to update the status of the successfully written write commands in journal 218 to "clean remote write."

If, at 316, the local host server 220 determines that "Yes," the write was successfully, then process 316 continues to process 318. At 318, controller 218 updates the status of the write command in the journal 212 to reflect "clean remote write," as described above. At 320, after updating the status of the write command in the journal 212 to reflect the "clean remote write," controller 218 reallocates the memory corresponding to the redundant copy of the data in the secondary die 216 (e.g., deleting the redundant copy of the data).

In each type of failure event (e.g., the SSD primary die failure, the host server failing prior to replication, Ethernet slowness/failure, and remote secondary server/storage failure prior to replication), the window of time where a single point of failure is possible (e.g., only one copy of the data exists) occurs when the unexecuted write commands are being added to journal 212. However, the approximate time it takes to write the parameters associated with the unexecuted write commands to journal 212 is $\frac{1}{10,000}$ of a second. Therefore, the single point of failure risk is much lower (by a factor of 10,000) than the 1-2 seconds of single point failure risk that is associated with current RAID systems. Furthermore, the above describe system and method (i) protects against individual die failure (e.g., by having a copy of the data stored on both primary die 214 and secondary die 216), (ii) protects against device failure by having a replicated copy of the data, (iii) protects against node (e.g., network/Ethernet failure) failure by having a replicated copy of the data, and (iv) protects against a datacenter natural disaster by having a replicated copy of the data in at least two different physical locations.

Other objects, advantages and embodiments of the various aspects of the present invention will be apparent to those who are skilled in the field of the invention and are within the scope of the description and the accompanying Figures. For example, but without limitation, structural or functional elements might be rearranged, or method steps reordered, consistent with the present invention. Similarly, a machine may comprise a single instance or a plurality of machines, such plurality possibly encompassing multiple types of machines which together provide the indicated function. The machine types described in various embodiments are not meant to limit the possible types of machines that may be used in embodiments of aspects of the present invention, and other machines that may accomplish similar tasks may be implemented as well. Similarly, principles according to the present invention, and methods and systems that embody them, could be applied to other examples, which, even if not specifically described here in detail, would nevertheless be within the scope of the present invention.

What is claimed:

1. A solid state drive for improving write consistency when replicating data, the solid state drive comprising:

a plurality of memory die;
a host interface; and
a memory controller, the memory controller configured to:
  receive one or more write commands from a host server,
  update a list of write commands and a status of execution of the write commands to include the one or more write commands from the host server,
  write one or more data payloads associated with the one or more write commands, respectively, to at least a first memory die of the plurality of memory die and to a second memory die of the plurality of memory die,
  in response to the one or more data payloads being written, update the status of execution for the one or more data payloads in the list of write commands,
  receive an indication that the one or more data payloads have been written to an external device, and
  in response to receiving the indication that one or more data payloads have been written to the external device, reallocate, as free memory, memory of the second memory die containing the one or more data payloads.

2. The solid state drive of claim 1, wherein the external device is a remote server.

3. The solid state drive of claim 1, wherein the host interface is further configured to:
  write the one or more data payloads associated with the one or more write commands to the second memory die after the one or more data payloads associated with the one or more write commands have been written to the first memory die.

4. The solid state drive of claim 1, wherein the host interface is further configured to detect a failure event.

5. The solid state drive of claim 4, wherein, in response to detecting the failure event, the host interface is further configured to:
  update the list to indicate the failure event; and
  in response to detecting that the failure event occurred on the second memory die: retrieve the one or more data payloads associated with the one or more write commands from the first memory die, and
  write the retrieved one or more data payloads associated with the one or more write commands to a third die memory in the plurality of die memory.

6. The solid state drive of claim 4, wherein, in response to detecting the failure event, the host interface is further configured to:
  determine that the host server has experienced the failure event;
  retrieve one or more data payloads associated with one or more write commands that have not been executed from the first memory die; and
  write the one or more data payloads associated with the one or more write commands that have not been executed from the first die memory on an external solid state drive.

7. The solid state drive of claim 4, wherein, in response to detecting the failure event, the host interface is further configured to:
  determine a connection failure with an external device; and
  write the data payloads associated with the one or more write commands to a third die memory in the plurality of die memory.

8. The solid state drive of claim 4, wherein, in response to detecting the failure event, the host interface is further configured to:
  determine that an external device has experienced the failure event; and
  write the data payloads associated with the one or more write commands to a third die memory in the plurality of die memory.

9. A method for improving write consistency when replicating data, the method comprising:
  receiving one or more write commands from a host server;
  updating a list of write commands and a status of execution of the write commands to include the one or more write commands from the host server;
  writing one or more data payloads associated with the one or more write commands, respectively, to at least a first memory die of the plurality of memory die and to a second memory die of the plurality of memory die;
  in response to the one or more data payloads being written, updating the status of execution for the one or more data payloads in the list of write commands;
  receiving an indication that the one or more data payloads have been written to an external device; and
  in response to receiving the indication that one or more data payloads have been written to the external device, reallocating, as free memory, memory of the second memory die containing the one or more data payloads.

10. The method of claim 9, wherein the external device is a remote server.

11. The method of claim 9, further comprising:
  writing the one or more data payloads associated with the one or more write commands to the second memory die after the one or more data payloads associated with the one or more write commands have been written to the first memory die.

12. The method of claim 9, wherein the host interface is further configured to detect a failure event.

13. The method of claim 12, further comprising:
  in response to detecting the failure event:
    updating the list to indicate the failure event, and
    in response to detecting that the failure event occurred on the second memory die: retrieving the one or more data payloads associated with the one or more write commands from the first memory die, and
    writing the retrieved one or more data payloads associated with the one or more write commands to a third die memory in the plurality of die memory.

14. The method of claim 12, further comprising:
  in response to detecting the failure event:
    determining that the host server has experienced the failure event,
    retrieving one or more data payloads associated with one or more write commands that have not been executed from the first memory die, and
    writing the one or more data payloads associated with the one or more write commands that have not been executed from the first die memory on an external solid state drive.

15. The method of claim 12, further comprising:
  in response to detecting the failure event:
    determining a connection failure with an external device, and
    writing the data payloads associated with the one or more write commands to a third die memory in the plurality of die memory.

16. The method of claim 12, further comprising:
in response to detecting the failure event:
- determining that an external device has experienced the failure event, and
- writing the data payloads associated with the one or more write commands to a third die memory in the plurality of die memory.

\* \* \* \* \*